(No Model.)
E. A. GREEN.
BICYCLE BEARING.
No. 572,003.  Patented Nov. 24, 1896.
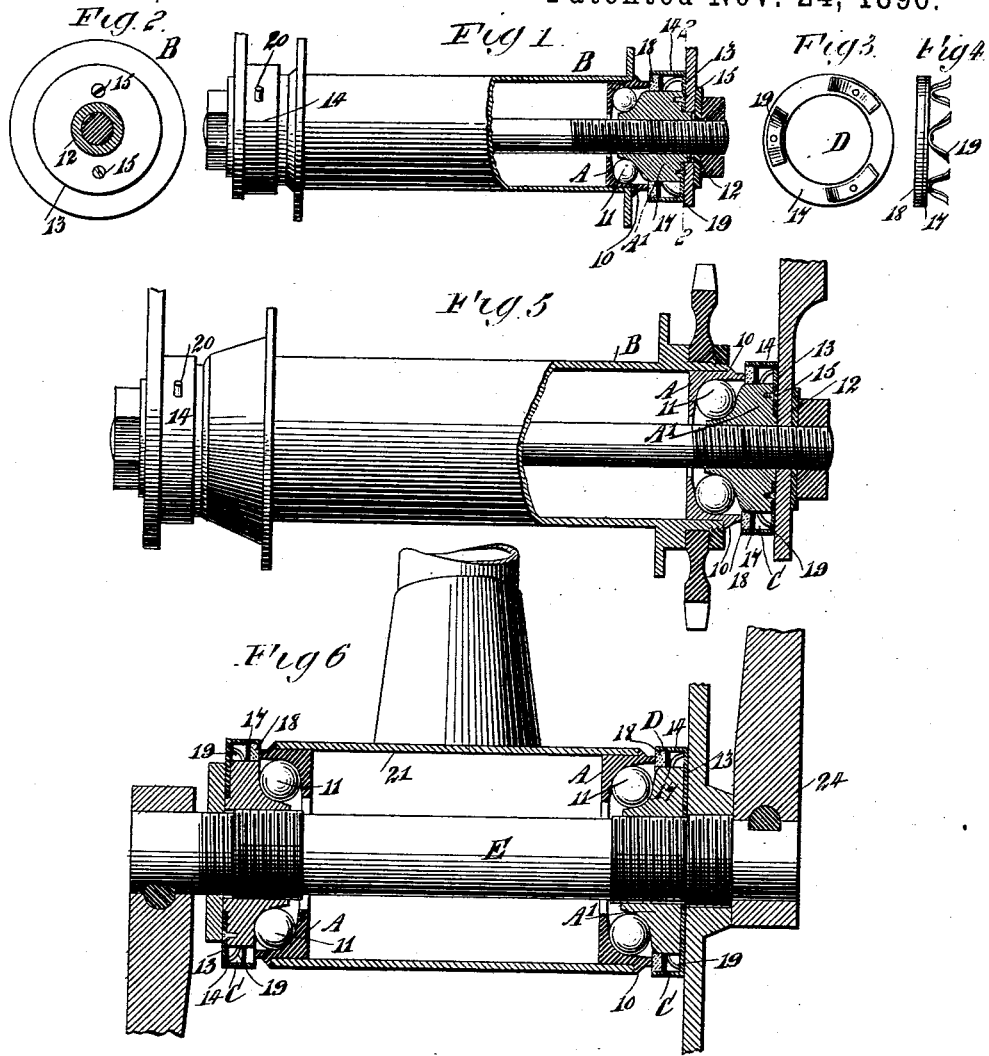
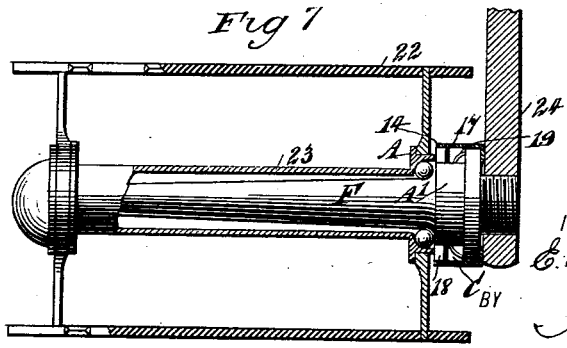
WITNESSES:
INVENTOR
E. A. Green
BY
Munn & Co.
ATTORNEYS.

UNITED STATES PATENT OFFICE.

EDWARD A. GREEN, OF BATTLE CREEK, MICHIGAN.

BICYCLE-BEARING.

SPECIFICATION forming part of Letters Patent No. 572,003, dated November 24, 1896.

Application filed November 7, 1895. Serial No. 568,198. (No model.)

*To all whom it may concern:*

Be it known that I, EDWARD A. GREEN, of Battle Creek, in the county of Calhoun and State of Michigan, have invented a new and useful Improvement in Bicycle-Bearings, of which the following is a full, clear, and exact description.

My invention relates to an improvement in bicycle-bearings; and it has for its object especially to provide a means whereby the dust will be thoroughly excluded from the bearing, and whereby also the use of oil-holes will be dispensed with.

Another object of the invention is to provide a spring-controlled washer to be used in connection with the ordinary bearing, which washer will effectually close the space between the cup and cone of the bearing, the washer being so placed as to admit of a lubricating material being introduced directly into the space in which the balls of the bearing are placed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a partial side elevation and a partial sectional view of the hub portion of the forward wheel, the bearing being entirely in section. Fig. 2 is a transverse section taken substantially on the line 2 2 of Fig. 1. Fig. 3 is an outer face view of the improved washer. Fig. 4 is an edge view of the said washer. Fig. 5 is a partial side elevation of the hub of the rear wheel, illustrating the application of the washer to the bearing of the same, the washer and bearing being in section. Fig. 6 is a longitudinal section through the casing and bearing of the pedal-shaft, illustrating the application of the washer to the said bearing; and Fig. 7 is a partial side elevation and partial sectional view of a pedal, illustrating the application of the improvement to the same.

In carrying out the invention in the application of the device to the bearings of a wheel, for example, a cup A is forced into the hub B until a shoulder 10, formed exteriorly on the cup, shall engage with the outer end of the hub, as shown in Figs. 1 and 5. The usual cone A' is employed in connection with the cup, and the balls 11 revolve in the ordinary way between the cup and cone. The cone, however, is preferably provided with a central boss 12 upon its outer face, and a band 14 surrounds that portion of the periphery of the cone which is exposed when the cone is in place. The said band is held a predetermined distance from the periphery of the cone by means of a disk 13, the disk and band being made in one piece, and said disk is apertured to receive the boss of the cone and secured at its periphery to the outer edge of the aforesaid band, the disk being secured to the cone by means of screws 15 or their equivalents, as shown in Fig. 2, and the band and disk constitute a cup-casing.

Between the band of the cup-casing and the cone an annular chamber C is formed, open at its inner side or that side which faces the cup of the bearing. A washer D is located within the chamber C of the cone, and this washer preferably consists of a metal ring or backing 17 and a facing 18, preferably made of oiled rawhide or pig-skin, and springs 19 are secured to the back of the said ring 17, as shown in Figs. 3 and 4. The springs bear against the inner face of the disk 13, attached to the cone, and normally force the bearing-face 18 of the washer against the outer edge of the cup of the bearing, thereby closing the space, which would otherwise intervene the cone and the outer edge of the cup, and effectually preventing dust or water or other injurious foreign matter from entering the ball-chamber of the bearing.

It is obvious that oil-holes are not required for a bearing having the improved washer applied, since an oil-can with, for example, a slightly-curved spout may be employed to introduce oil directly into the ball-chamber of the bearing by pressing the washer outward or away from the outer edge of the cup and introducing the spout in the space thus obtained. Pins 20 are preferably secured upon the outer face of the band 14 in order to receive a spanner for the purpose of tightening up the bearings.

It is obvious that a washer constructed as above set forth and applied to the ball-bearings in the manner described will render the said bearings dust and liquid proof, and as heretofore stated the oil-holes which frequently admit dust and grit to the bearings may be entirely dispensed with, and the lubricating material may be applied directly to the balls.

In Fig. 6 I have illustrated the application of the washer to the bearings applied to a crank-shaft E, showing the same as surrounded by its casing 21, and in Fig. 7 the washer is shown as applied to the spindle F of a pedal 22. In this event the cup is shown as made integral with the casing 23, that surrounds the spindle, and the bearing shown is that which is next to the crank-arm 24 of the pedal-shaft.

Having thus described my invention, I claim as new and desire to secure by Letters Patent—

1. A bicycle-bearing, having a chamber formed around the exterior of its cone, and a spring-controlled washer contained in the said chamber, being held by the springs against the outer edge of the cup of the bearing, as and for the purpose set forth.

2. In a bicycle-bearing, the combination, with the cup and the cone thereof, the cone being provided at its exposed portion with a peripheral chamber open at that side which faces the cup, a washer located within the said chamber, facing the outer edge of the cup, and springs attached to the washer, acting to force the said washer to a contact with the said cup, thereby closing the space which would otherwise intervene the outer edge of the cup and the opposed surface of the cone of the bearing, as and for the purpose specified.

3. The combination, with the cup and cone of a ball-bearing, the cone being provided with an exterior or peripheral chamber open where the said chamber faces the cup, a washer constructed of rawhide, located within the said chamber, being adapted to engage with the outer edge of the cup, a backing for the said washer, and springs secured to the said backing and having bearing against the outer wall of the said cone-chamber, the springs acting to normally force the washer to a bearing against the outer edge of the cup, as and for the purpose set forth.

4. In a bicycle-bearing, the combination, with a cup provided with an exterior shoulder, a cone, and the balls between the cone and the cup, of a band having an attached disk secured to the outer side surface of the cone, the band extending around a portion of the periphery of the cone, forming an annular chamber, and a spring-controlled washer located within the said chamber, being held by the springs against the outer edge of the cup, normally closing the space which would otherwise intervene the said outer edge of the cup and the adjoining surface of the cone, as and for the purpose specified.

5. The improvement in bicycle-bearings herein described, consisting of the cup, the cone, a cup-casing composed of a band and a disk, the disk being secured to and projecting radially beyond the outer end of the cone, and the band projecting from said disk longitudinally inward over the cone forming a washer-chamber around said cone, the washer fitted in said chamber and bearing against the outer edge of the cup and the springs in said casing and bearing between the disk and the washer and pressing the same against the outer edge of the cup, all substantially as and for the purpose set forth.

EDWARD A. GREEN.

Witnesses:
MAURICE H. NEALE,
GEORGE F. NEALE.